Patented Feb. 24, 1925.

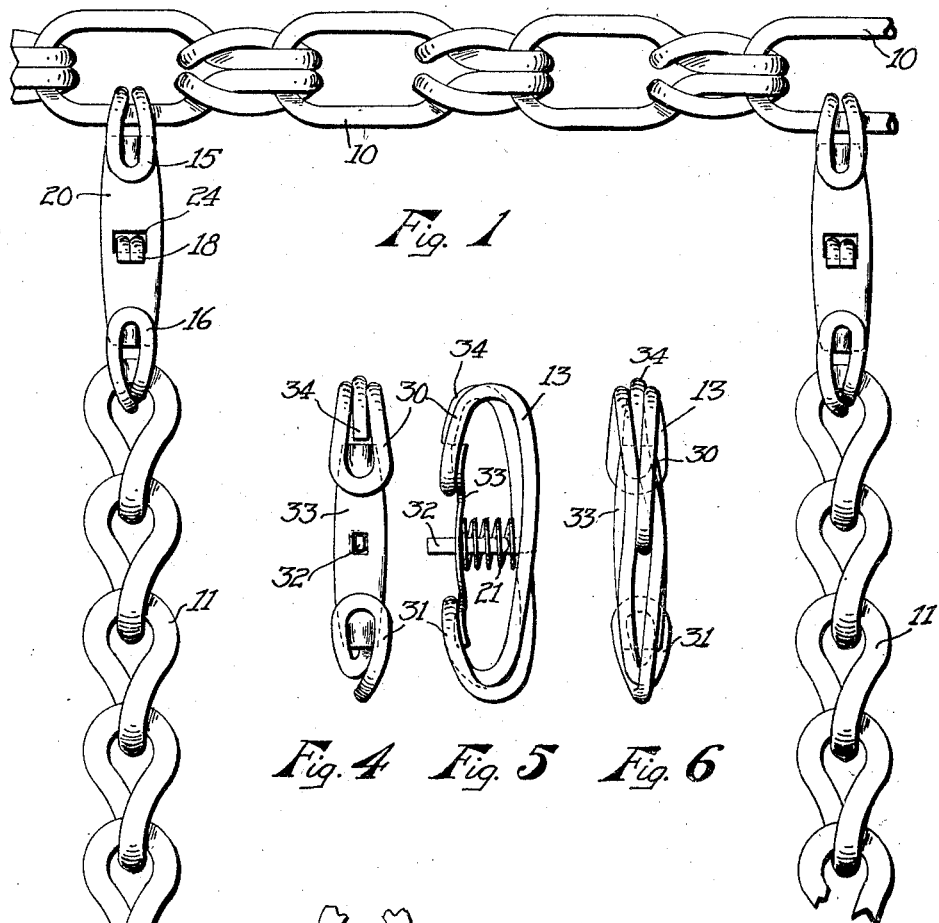
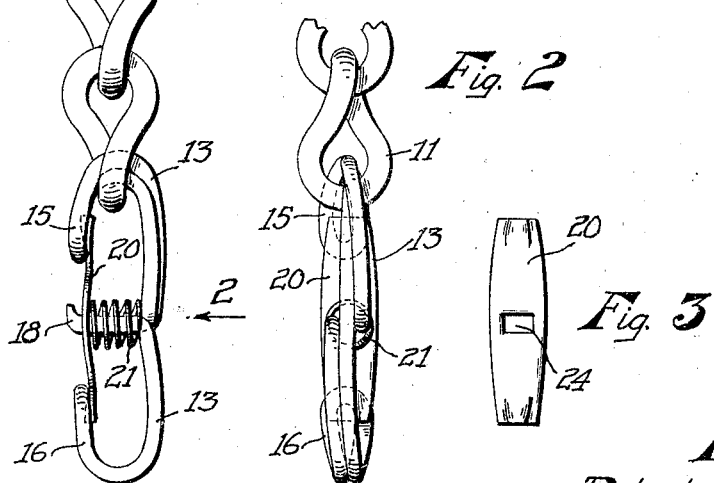

1,527,741

UNITED STATES PATENT OFFICE.

PATRICK McLOUGHLIN, OF WORCESTER, MASSACHUSETTS.

CHAIN CONNECTER.

Application filed October 30, 1924. Serial No. 746,874.

*To all whom it may concern:*

Be it known that I, PATRICK McLOUGHLIN, a citizen of the United States, residing at Worcester, in the county of Worcester and State of Massachusetts, have invented a new and useful Chain Connecter, of which the following is a specification.

This invention relates to a chain connecter capable of general application but particularly designed for use in attaching the cross chains used in anti-skidding devices for automobiles. It is frequently necessary to remove and replace such cross chains and it is the object of my invention to provide a connecter for such purposes which may be easily and economically manufactured and which will be reliable and efficient when in use.

Two forms of my invention are shown in the drawings in which—

Fig. 1 is a plan view of portions of cross and side chains and showing my connecters in use;

Fig. 2 is a bottom view of one of the connecters shown in Fig. 1;

Fig. 3 is a plan view of the locking plate for this connecter; and

Figs. 4, 5, and 6 are plan, side, and bottom views respectively of a slight modification.

Referring particularly to Figs. 1 to 3, I have indicated portions of a side chain 10 and cross chains 11 which are of the usual construction. I have also shown the cross chains as secured to the side chains by means of my improved connecters.

Each of these chain connecters is formed from a single piece of wire 13 which is bent to form reversely disposed loops 15 and 16, the loop 15 passing through a link of the side chain 10 and the loop 16 passing through the end link of a cross chain 11. It will be noted that the two portions of wire forming the loop 16 are disposed longitudinally at the point where they engage the cross chain, while the two portions of wire forming the loop 15 are disposed transversely. This longitudinal construction of the loop 16 permits the connecter to be freely movable in a cross chain link having a relatively narrow opening.

The two extreme end portions 18 of the wire 13 are bent substantially at right angles, as indicated in Fig. 5, and project transversely between the ends of the loops 15 and 16. These end portions 18 form a guide or support for a locking plate 20 which is slidable thereon and is yieldingly pressed outward to engage the loops 15 and 16 by a coil spring 21 surrounding the end portions 18.

The plate 20 has a transversely elongated rectangular opening 24 through which the end portions 18 project and this rectangular opening holds the plate 20 from angular displacement.

It will be evident that my improved connecter is extremely simple in construction and that it is exceptionally well adapted for the purposes for which it is designed. The connecter is readily snapped into a link of the side chain or the cross chain, the locking plate yielding to permit such attachment. As soon as the connecter is in place, however, the locking plate resumes its normal position and effectively prevents accidental separation of the parts.

The device may be very cheaply manufactured by automatic machinery as it is formed entirely by bending a single piece of wire. A connecter thus formed is exceptionally strong and is well adapted to resist the heavy strains encountered when in use.

In Figs. 4, 5, and 6, I have shown a modified form of my invention, in which end loops 30 and 31 are formed similar to the construction already described. One end portion 32 of the wire is bent at a substantial right angle, as indicated in Fig. 5, to form a guide for the locking plate 33, but the other end portion 34 is continued across the back or bottom of the connecter and is bent upward between the sides of the loop 30, thus forming a third member to engage the side chain.

The end portion 32 is preferably formed with a square section to receive the locking plate 33 and to prevent angular displacement thereof. The use and advantages of this form of my invention are substantially the same as that already described.

Having thus described my invention and advantages thereof, I do not wish to be limited to the details herein disclosed otherwise than as set forth in the claims, but what I claim is:—

1. A chain connecter comprising a single piece of wire bent to form reversely disposed loops at opposite ends of the connecter, a locking plate, and a transversely extending support on which said plate is slidably mounted, said support being formed by an integral end portion of said single piece of wire.

2. A chain connecter comprising a single piece of wire bent to form reversely disposed loops at opposite ends of the connecter, a locking plate, and a transversely extending support for said plate, formed by the two extreme end portions of said single piece of wire.

3. A chain connecter comprising a single piece of wire bent to form reversely disposed loops at opposite ends of the connecter, a locking plate, and a transversely extending support for said plate, the two parts of the loop at one end of said connecter being disposed longitudinally of the connecter to reduce the width thereof at its point of attachment.

4. A chain connecter comprising a single piece of wire bent to form reversely disposed loops at opposite ends of the connecter, a locking plate, and a transversely extending support for said plate, formed by the two extreme end portions of said single piece of wire, said end portions being disposed side by side and extending through a transversely elongated opening in said plate.

In testimony whereof I have hereunto affixed my signature.

PATRICK McLOUGHLIN.